(12) United States Patent
Trela et al.

(10) Patent No.: US 7,253,730 B2
(45) Date of Patent: Aug. 7, 2007

(54) REMOTE INTELLIGENCE AND INFORMATION GATHERING SYSTEM (IGS)

(76) Inventors: Nicholas Steven Trela, 100 Pierce St. # 1101, Clearwater, FL (US) 33756; Richard Steven Trela, 100 Pierce St. # 1101, Clearwater, FL (US) 33756

( * ) Notice: Subject to any disclaimer, the term of this patent is extended or adjusted under 35 U.S.C. 154(b) by 346 days.

(21) Appl. No.: 11/087,147

(22) Filed: Mar. 23, 2005

(65) Prior Publication Data
US 2005/0211084 A1   Sep. 29, 2005

Related U.S. Application Data

(60) Provisional application No. 60/555,760, filed on Mar. 24, 2004.

(51) Int. Cl.
*G08B 1/08* (2006.01)
*H04Q 7/00* (2006.01)
(52) U.S. Cl. ............... 340/539.11; 348/153; 2/422; 340/539.13
(58) Field of Classification Search ........... 340/539.11, 340/541
See application file for complete search history.

(56) References Cited
U.S. PATENT DOCUMENTS
7,091,851 B2 * 8/2006 Mason et al. .......... 340/539.13

2002/0180866 A1 * 12/2002 Monroe .............. 348/153
2006/0048286 A1 * 3/2006 Donato .................. 2/422

* cited by examiner

*Primary Examiner*—Jeffery Hofsass
*Assistant Examiner*—Samuel J. Walk

(57) ABSTRACT

A wireless remote multi-data information and intelligence gathering machine and system designed to be used tactically by the military as well as law enforcement personnel to assist them in intelligence an information gathering in a multitude of scenarios from S.W.A.T. (Special Weapons And Tactics) emergencies, covert surveillance, nighttime intrusion detection, to rescue operations of trapped victims. The information gathering unit and system (IGS) housed in an, all-climate and conditions housing, that's unique combination of components, gather data ranging from gamma detection, zone intrusion detection, audio surveillance, video surveillance, video documentation of identification of personnel and visitors to high risk locations to use in nighttime rescue operations. The high quality data transmitted is received by a base station that is fully capable furthering the information gathered via the internet to offsite officials as well as being equipped to fully document all data gathered in high quality digital format. Further, this ruggedly designed system unit collects, and transmits wirelessly over long distances, making standoff security tactics easy to effect. The unit is fully equipped to operate in totally dark conditions by the use of it's built in infrared lighting illumination.

2 Claims, 17 Drawing Sheets

REMOTE INTELLIGENCE AND INFORMATION GATHERING SYSTEM (IGS)

CROSS REFERENCE TO RELATED APPLICATIONS

This application is entitled to the benefit of Provisional Patent Application No. 60/555,760 Mar. 24, 2004

STATEMENT REGARDING FEDERALLY SPONSORED RESEARCH AND DEVELOPMENT

Not Applicable

BACKGROUND OF THE INVENTION

1. Field of the Invention

This invention relates generally to the field of law enforcement and force protection equipment employed by S.W.A.T. teams and A.T. (Anti-Terrorism) military personnel in the functions of protecting the public, assets, or themselves while preserving the peace. More particularly, a wireless, self contained information gathering unit and system (IGS) designed to effect numerous tactical, information gathering tasks, such as remote intrusion detection, under vehicle and trunk inspections, tactical surveillance from a safe stand-off distance, remote identification recording and entrance documentation, at-night evidence gathering at crime scenes, radiological element detection, search and rescue operations and many other stand-off related, remote viewing and information gathering scenarios. In addition, the system is equipped with a microphone for remote audio surveillance and full audio and video documentation for use at crime scenes, emergency response and arrest documentation. When used by fire departments, the described invention becomes a threat and risk assessment aid as well as a means of providing rescue crews an advantage by extending sight and sound capabilities, way beyond the norm such as might be needed in collapsed buildings or fire restricted areas as well as providing an audio-visual communication link to rescue persons trapped who can be given the IGS unit to use to communicate, but cannot be gotten to yet to be freed.

2. Background of the Invention

Development of special equipment such as the present invention, (IGS system) has grown out of the need for law enforcement and military personnel to respond to critical, usually manmade, emergencies such as hostage taking, terrorist infiltration and attacks and a multitude of other real-life, critical situations that need to be responded to by specialists, with specialized equipment, in order to, neutralize the situation or minimize loss after a situation has unfolded. Current domestic law enforcement use of special weapons and tactics originated with the first Special Weapons And Tactics (SWAT) Unit which consisted of 15 four-man teams. Members of each team, who volunteered from the ranks of patrol and other police assignments, had specialized experience and prior military service. Each unit was activated for monthly training or when the need for special weapons personnel actually arose. These units, known as "station defense teams," provided security for police facilities during civil unrest. In 1983, the Los Angeles Police Department sent three S.W.A.T. supervisors to Europe to evaluate and develop the techniques employed by military groups such as the German GSG-9, French GIGN and the legendary British 22nd SAS. A rigorous and difficult training program was implemented with one objective—to develop a true hostage rescue capability within the LAPD S.W.A.T. Team. Since the advent of the domestic hostage rescue skill, the LAPD S.W.A.T. Team has rescued dozens of hostages and currently handles approximately 80 barricaded suspect incidents and 50 high-risk warrants a year. After the terrorist attacks of September 11th, S.W.A.T. teams across the have had to reorganize to thwart possible terrorist attacks and have become A.T. (anti-terrorism) teams as well as S.W.A.T teams, requiring them to develop new tactics and seek out new equipment for handling new types of terrorist risks and life threatening situations. The present invention has been fully reviewed and endorsed by A.T. (antiterrorism) and F.P. (force protection) security personnel from many Govt. agencies such as NASA, DHS, TSA U.S. Army, U.S. Navy, Charlotte, N.C. S.W.A.T. team and others, with a very positive support for it's use and implementation. Indeed, with it's truly diverse tactical uses, as well as A.T. countermeasures that provides instant remote viewing, remote stealth detection, remote night vision surveillance, remote first responder footage review in real-time by offsite government agencies, remote audio listening and situation debriefing, remote sound detection as well as with many other features and uses, along with it's rugged design and excellent thermal and weather proofing features, the present invention is truly a innovation that fits, not only right in to the traditional S.W.A.T. arsenal for S.W.A.T scenarios, but also provides for many new tactical countermeasure procedures needed by the A.T. and FP (force protection) world of the $21^{st}$ century. The system also equipped with a radiological, detector is an excellent tool for law enforcement officials to use to detect dirty bombs, a new threat in today's world.

Boston on High Alert after FBI Bomb Threat (Boston-AP, Jan. 19, 2005)—Teams of police officers are prowling the streets of Boston with radiological sensors as the FBI tries to unravel uncorroborated information that indicates someone may intend to detonate a dirty bomb.

Prior art examples will be found to be limited as this versatile new invention, was born out of needs from our recent changing times, requiring new tactics, equipment and systems for preserving the security of our homeland.

ADVANTAGES OF THE INVENTION

The overwhelming immediate acceptance by law enforcement agencies of the current invention has validated the fact that there has been a strong, long felt need for an efficient and convenient method to extend communications for tactical S.W.A.T or military applications easily under all manner of challenging environmental or hostile combat conditions. The present invention is so versatile, that law enforcement and military personnel are consistently finding new uses of the present invention, as the multitude of challenges they face everyday in law enforcement and security actions are greatly assisted with the remote communications features of the IGS, (Information Gathering System) unit.

The current invention provides many new and unique advantages for law enforcement officials in the fight against terrorism, as because of the nature of terrorist attacks, it is commonly necessary to rapidly set up a stand-off (safe distance) security perimeter, while still having real-time communications capabilities with the outer perimeter for intelligence information gathering. The present invention allows it's users operate tactically on an extended range basis, (1 mile line of sight and beyond) and provides for fast, tactical set-ups of extended range information and intelligence gathering in all types of operating environments. It's easy use allows for excellent results to be obtained by even the most technically unskilled users. Another additional advantage of the present invention is that weather problems, such as wind blown sand, rain, extreme cold, or other environmental factors that may inhibit proper stand-off security surveillance and intelligence gathering, can now be remotely gathered from a command post well away and out of the weather. The events of September 11th have also created the unforeseen need for insurance companies insuring against terrorism or assassinations to be able to document security diligence in preventing terrorist attacks or an assassination.

The present invention answers this problem by providing a real-time documentation of persons and vehicles entering high risk public locations and providing, through digital image electronic storage, a large digital library of preformed checkpoint screening actions by date and time, at each location where the IGS system is used. An additional advantage of the IGS system is that it is also capable of providing a real-time, audio/video account of emergency conditions or other law enforcement related information to off-site government officials via a password protected secured link on the internet.

SUMMARY OF THE INVENTION

The present invention describes a wireless, handheld, remote communications and information gathering unit and system (IGS) housed in an, all-climate and conditions housing, that's unique combination of components, provides wireless, tactical, law enforcement and force protection camera capability with additional intelligence gathering capabilities that enables it's users to greatly extend their surveillance, search, night vision, audio listening and covert security operations actions, easily and immediately upon activation of the unit. In addition, because if it's versatility, it can be rapidly deployed to tactically answer life-threatening, or critical rescue operations needs. The housing design also incorporates a unique handle-to-weight balance distribution system for comfortable easy use. In addition, the camera housing and balance features are calculated to provide all the necessary balance features to produce a strikingly steady, (during operator use—while moving), picture at the receiving end of the transmission that rivals expensive movie industry steadicam systems which are bulky and environmentally restrictive. Further, this ruggedly designed unit collects, and transmits wirelessly over long distances, audio and visual information for intelligence gathering, rescue condition searches and analyses, as well as nighttime crime scene documentation. The unit is fully equipped to operate in totally dark conditions by the use of it's built in infrared light illumination capabilities. In addition, the IGS system is equipped with radiological and gamma ray detector that can alert security officers a great distance away, to the presence of an excessive amount of radiological materials. The IGS unit, capable of multi-channel transmissions, can be used more than one at a time, providing simultaneous, multiple point information gathering to further benefit law enforcement and military personnel in a multitude of law enforcement, emergency rescue, and force protection scenarios.

BRIEF DESCRIPTION OF THE DRAWINGS

The present invention will be understood and appreciated more fully from the following description, taken in conjunction with the drawings in which.

DETAILED DESCRIPTION OF THE INVENTION

Figure 1:
FIG. 1 is an illustration of a preferred embodiment external appearance.

FIG. 1 illustrates a the IGS unit in a preferred housing embodiment that shows the a sleek rugged, and balanced design necessary for optimum use and easy handling.

Figure 2:
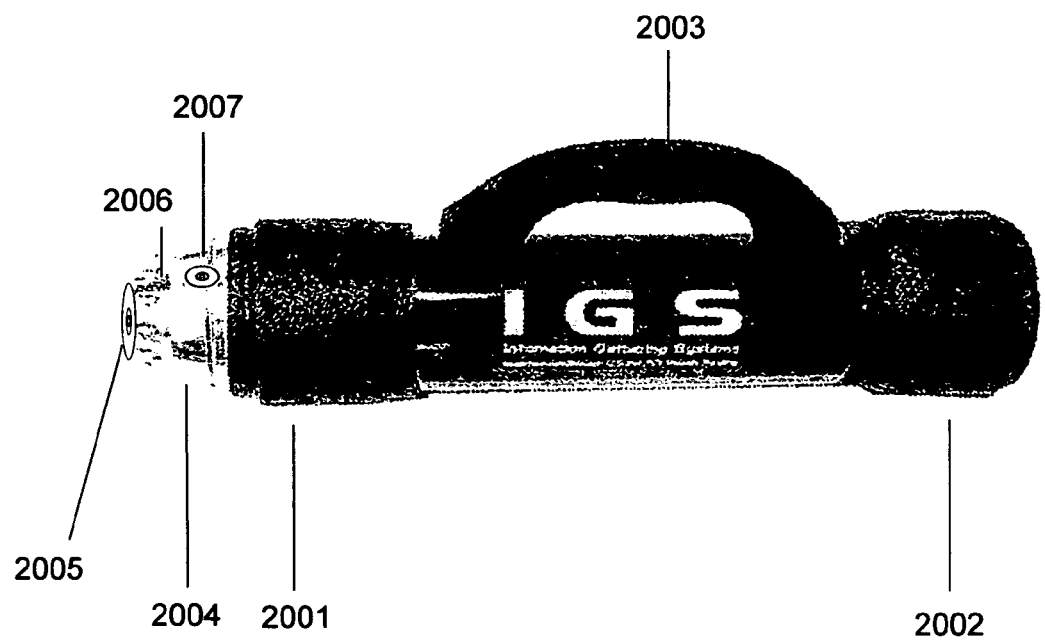
FIG. 2 is a diagram showing the internal components of the camera according to one embodiment.

FIG. 2 points out the basic features utilized by the IGS for wireless camera transmission. 2001 is the front housing balance collar and 2002 is the rear housing balance collar. The housing is balanced evenly by 2002 and 3001 when carried by handle 2003, creating a uniquely smooth unit to operate for steady camera work and other tactical operations. The hardened aluminum camera head is shown at 2004 is bullet resistant hardened which and is cone shaped for looking into small areas and crevices. 2005 is the camera eye and 2006 is the infrared illuminator ring for night vision capability. The microphone shown at 2007 is for remote audio listening and recording.

Figure 3:
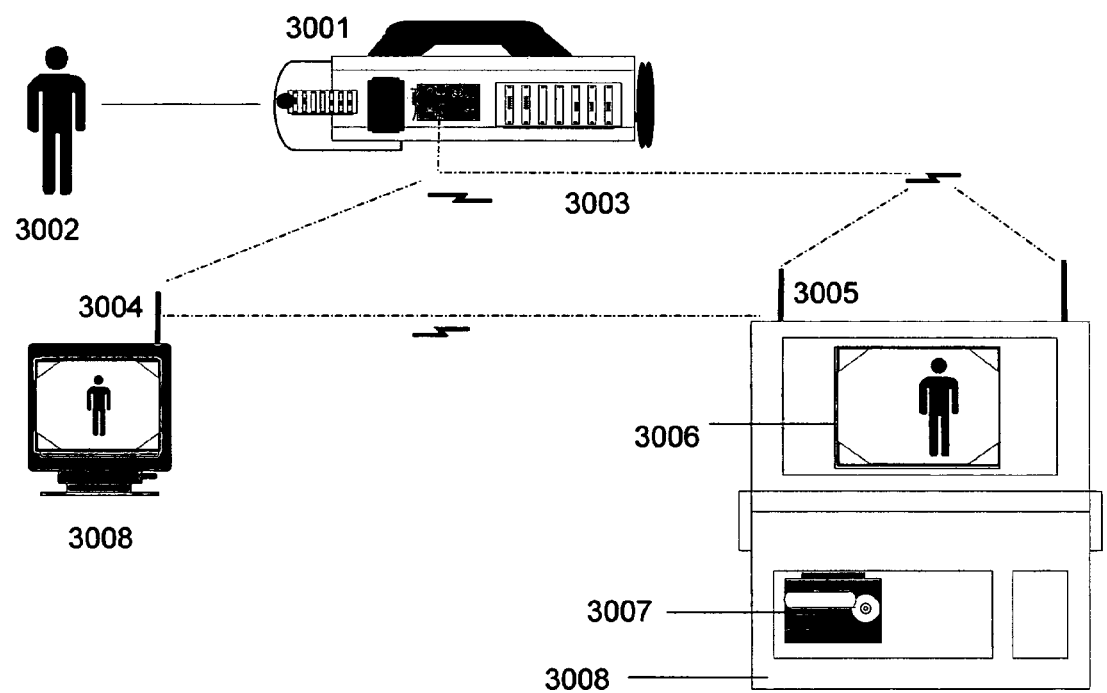
FIG. 3 is a diagram showing the IGS unit transmitting an image to a mini receiver screen and a larger receiving unit with a digital recorder for documentation.

FIG. 3 shows the IGS in action as a wireless camera being used to transmit an image remotely during a surveillance operation. The IGS unit 3001 is positioned so as to see person 3002 which is the wirelessly transmitted on transmission frequency 3003 generally in the 900 mgz-5.8 ghz range. The handheld wireless receiving unit 3008 is shown displaying the image of person 3002 after receiving transmission frequency 3003 on antenna 3004. The transmission image 3003 is also received by the antennas 3005 of the IGS portable recorder case and display unit 3008. From there the image is recorded on digital video recorder 3007 and simultaneously shown on an LCD screen 3006 for a real-time review of the person 3002 from a remote location.

Figure 4:
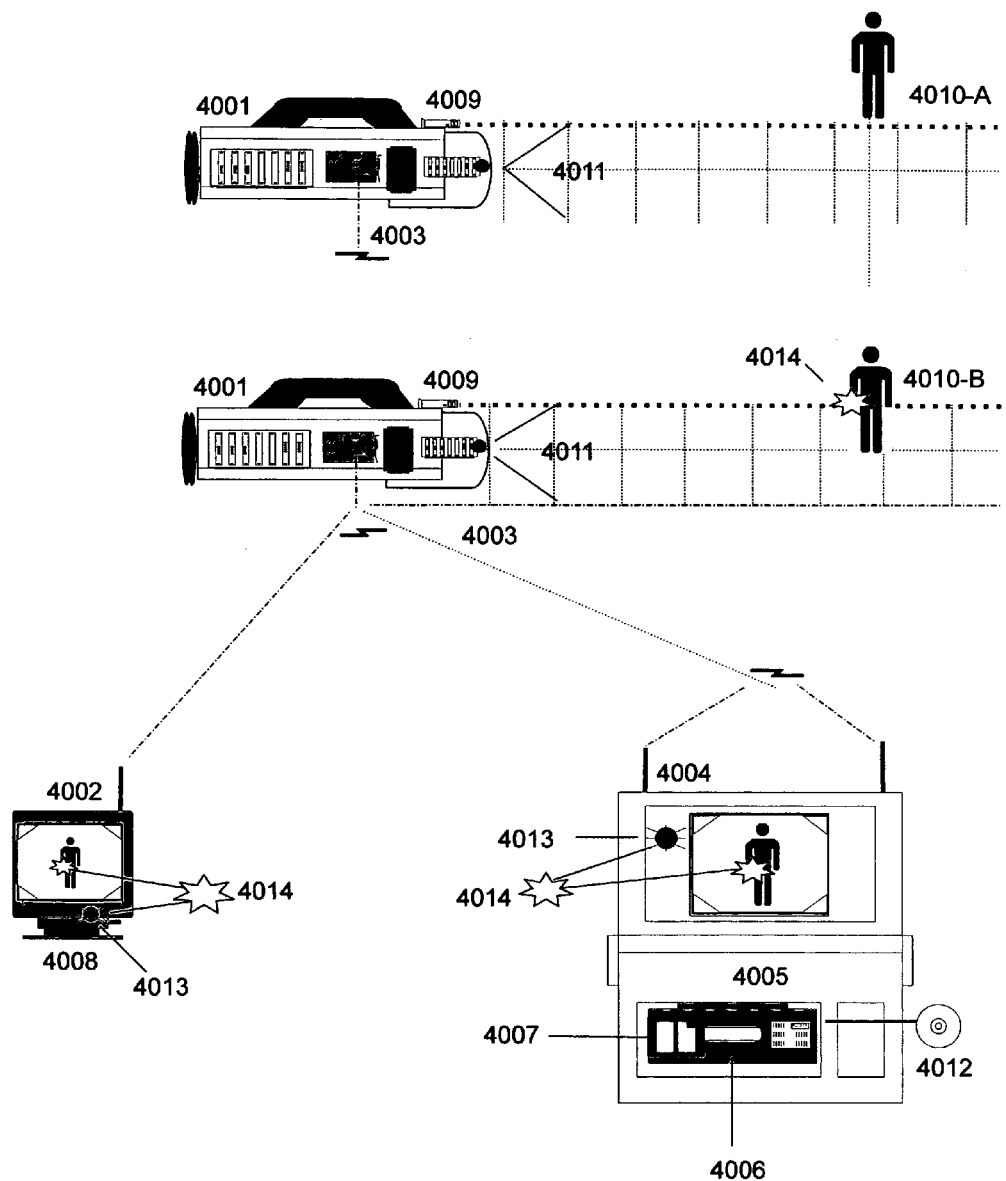
FIG. 4 is a diagram showing the IGS unit enhanced with a long-range camera lens and a laser identifier beam for nighttime detection alert.

FIG. 4 shows another feature of the IGS system wherein the camera is assisted for direction and specific aiming with a laser 4009. 4003 shows laser assisted IGS unit with a laser aimed at infinity just in front of the path of person 4010-A. The camera field of view 4011 is shown being directly pointed at person 4010-A's path as well. The laser assisted image is transmitted on frequency 4003 (between 900 mghz and 5.8 ghz) to antenna 4002 on the handheld monitor 4008 and the antennas 4004 on the IGS portable case 4005 equipped with a computer 4006 and a video card 4007 (Geo-Vision 600 or equivalent), with motion detection software 4012 installed that is programmed to register an audible motion detection alarm 4013 upon a noted motion detection event 4014. In night-time conditions, a person crossing 4010-B the laser beam 4009, creates an optical motion event 4014 that the computer 4006, video card 4007 and software 4012 detects, which then sounds audible alarm 4013. This creates an extremely effective long-range intrusion detection capability from a simple, single remote source—the IGS.

Figure 5:
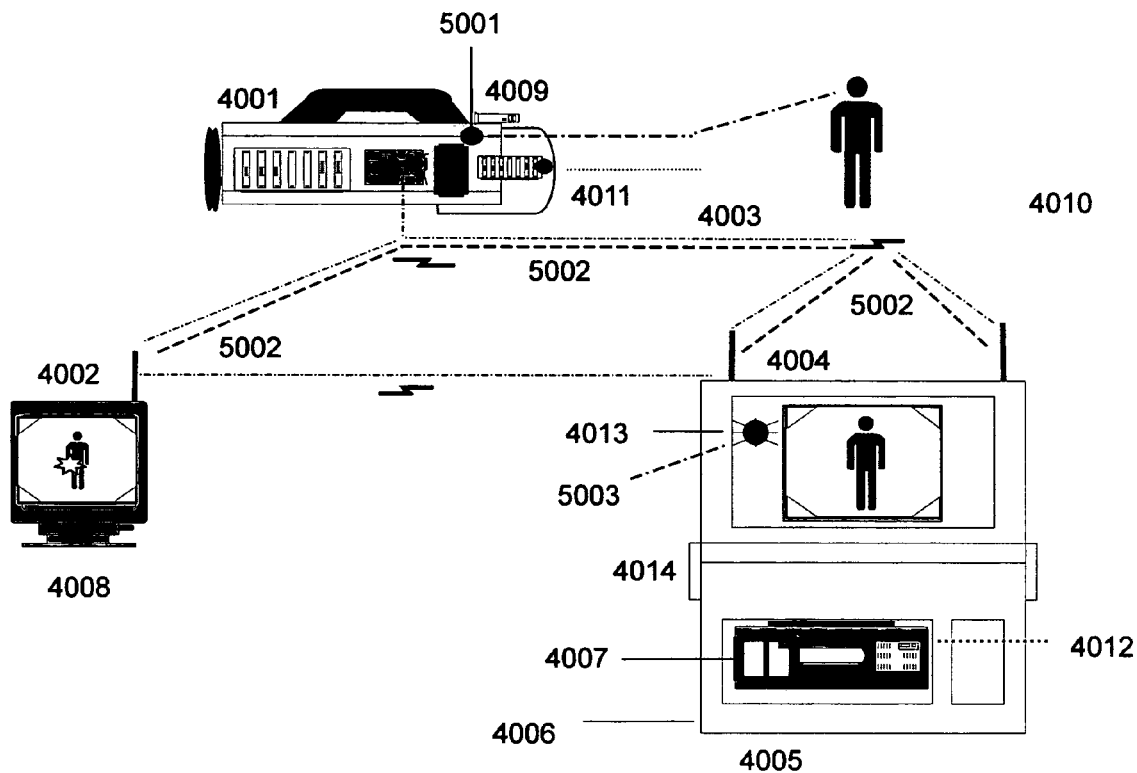
FIG. 5 is a diagram that shows the audio transmission capabilities of the IGS unit.

FIG. 5 shows the IGS 4001 being used with it's remote microphone 5001 activated for recording a persons' voice 5000 and transmitting it back to the portable IGS case 4005 and the IGS handheld monitor 4008 via wireless audio signal 5002. From there the signals are amplified and heard over speaker 5003 in the IGS case and 5004 in the IGS handheld audio-video receiver. The IGS in this role has many uses including rescue communication from trapped victims who can be given the camera down small crevices and outer hard to access places while the rescue excavation takes place.

Figure 6:
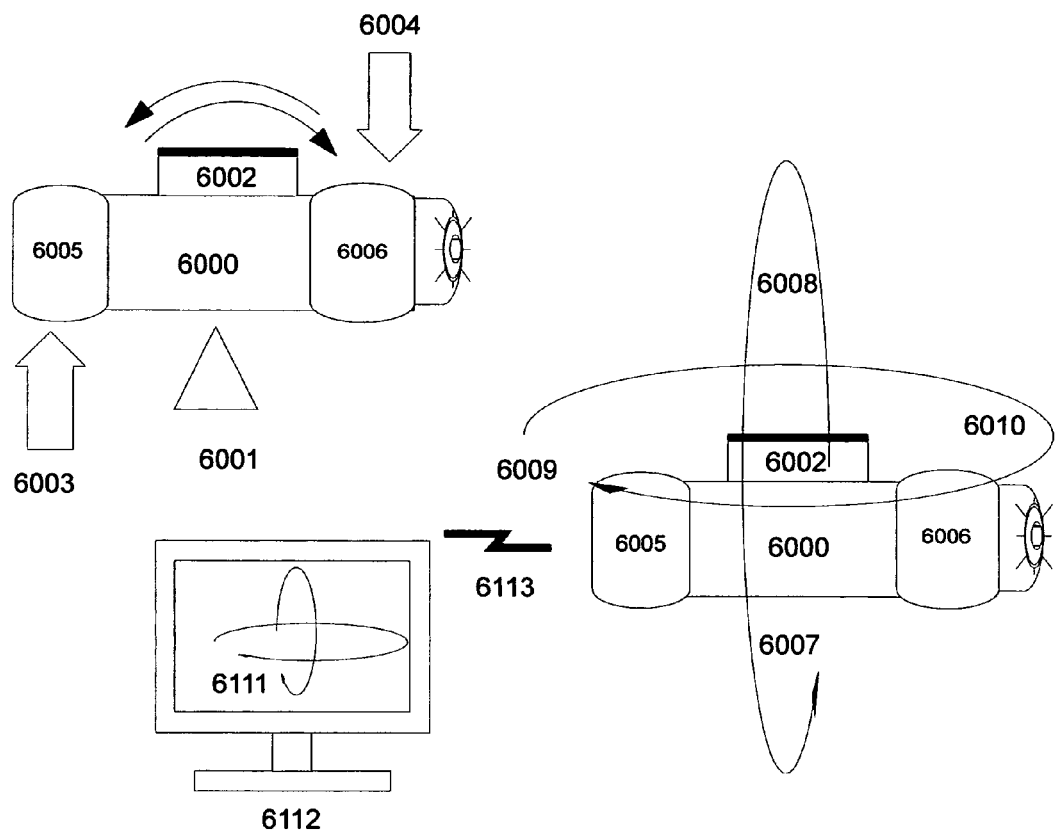
FIG. 6 is a diagram illustrating the steadicam qualities and balance dynamics of the IGS handle, housing and internal components.

FIG. 6 shows the dynamics of the steadicam features of the IGS unit 6000 in action as it balances itself against a center-of-gravity point 6001 and the handle 6002, wherein the "fulcrum point" 6001 is an illustration to designate the self leveling balanced fulcrum effect created by rear balance collar 6005 and front balance collar 6006. Gravity effect 6004 is equalized by gravity change 6003 during the course of use when held at the handle 6002 by a person using the IGS. The orbital action 6009 is also kept in balance while rotating the camera from left to right by a center of gravity, vertical correction effected easily by the IGS unit operator, by assistance from gravity 6008 and balance 6007 attributes of the housing's cylindrical shape and counter balance effects of rear balance collar 6005 and the front balance collar 6006 even while the IGS unit 6000 is rotating. The camera lens view 6010 is transmitted 6113 to monitor 6112 and displays the camera's view 6111 as a remarkably steady, and flowing motion picture even while in use in a rapid or swift motion by it's your user.

Figure 7:
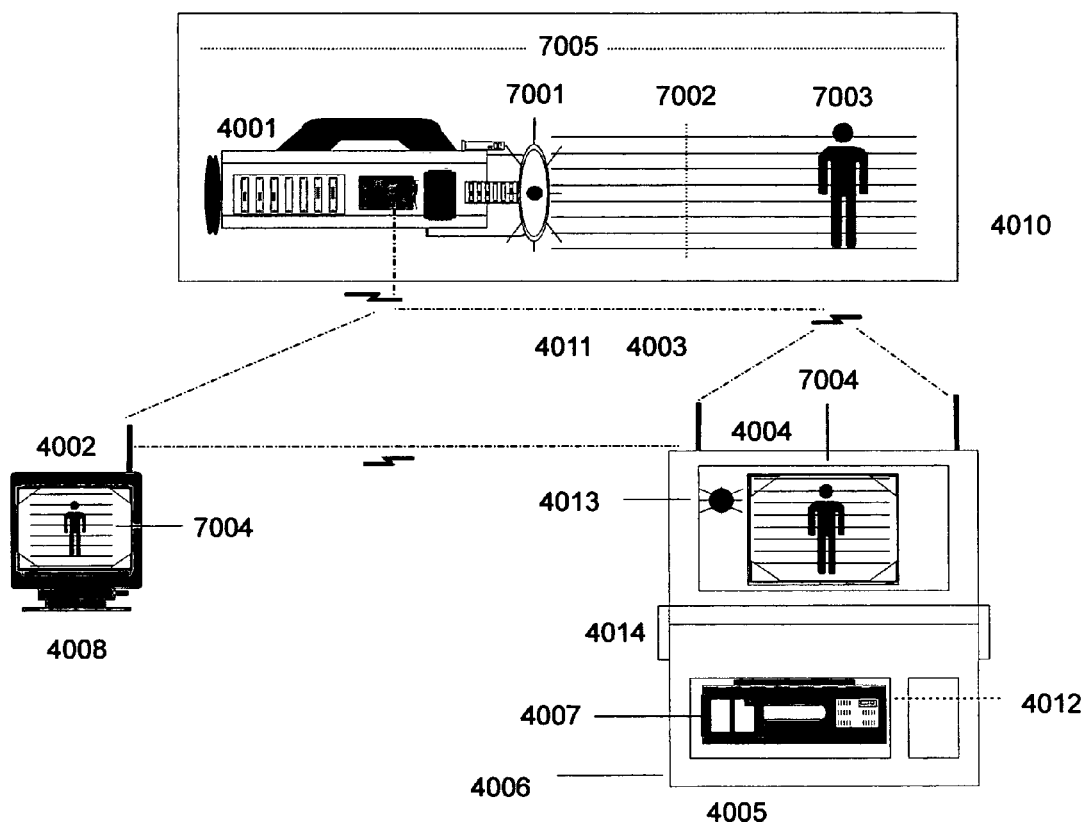
FIG. 7 is a diagram that shows the infrared capability of the IGS unit.

FIG. 7 illustrates the IGS camera being used in the dark 7005 with the infrared light feature 7001. The infrared lighting illuminates the darkness 7005 in a filed of view 7002 wherein person 7003 is seen in the darkness with high clarity on remotes screens on handheld monitor 4008 and IGS portable IGS case 4005 and transmitted to their viewing screens as infrared images 7004.

Figure 8:
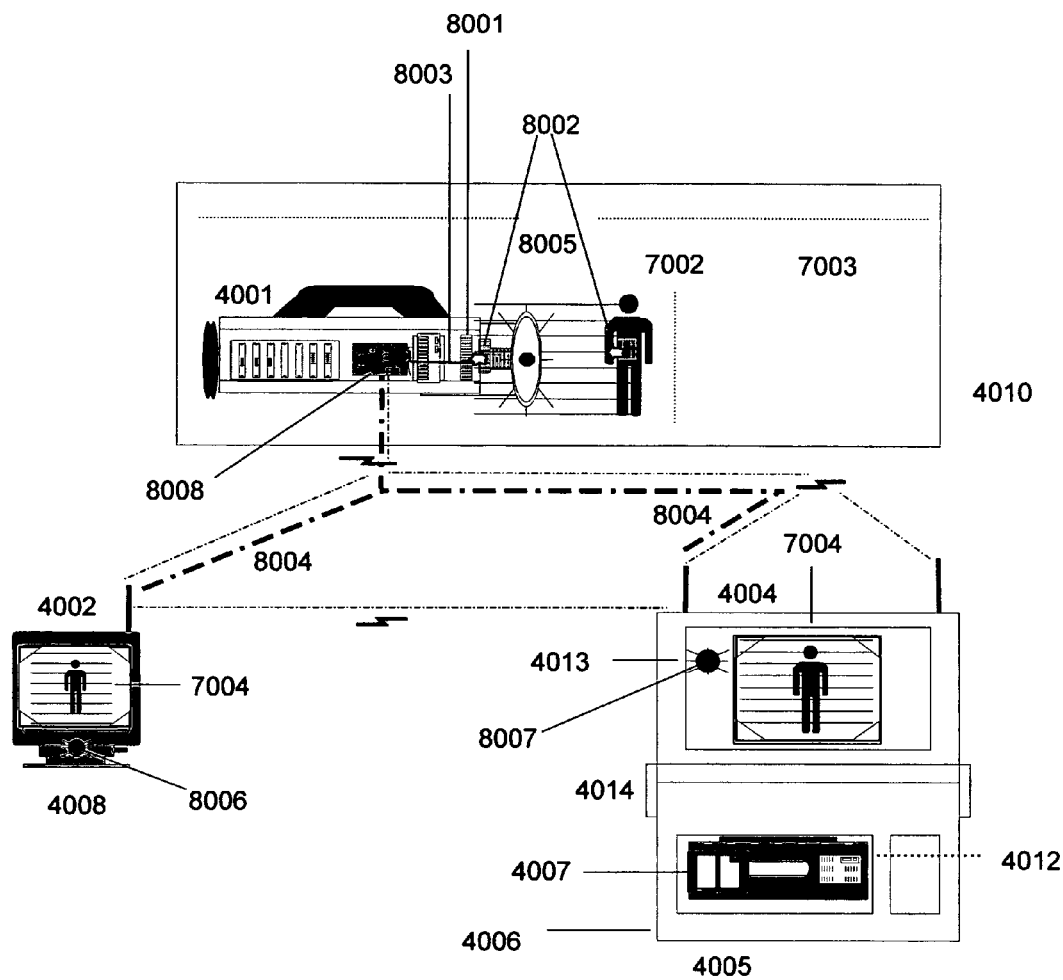
FIG. 8. is a diagram showing the IGS detecting radiological materials on a person and sending an alert a distance away to remote receivers.

FIG. 8 illustrates the IGS gamma detection system for detecting gamma rays and radiological materials. The radiological detector/relay 8001 gets set off by radiological material 8002 carried by person 7002. An audible signal is set off at the same time by signal generator and amplifier 8001 which is transmitted via the audio transmitter section of the IGS 8008 and sounded out loud at speaker 8006 of the IGS handheld monitor and 8007 of the portable IGS receiver case.

Figure 9:
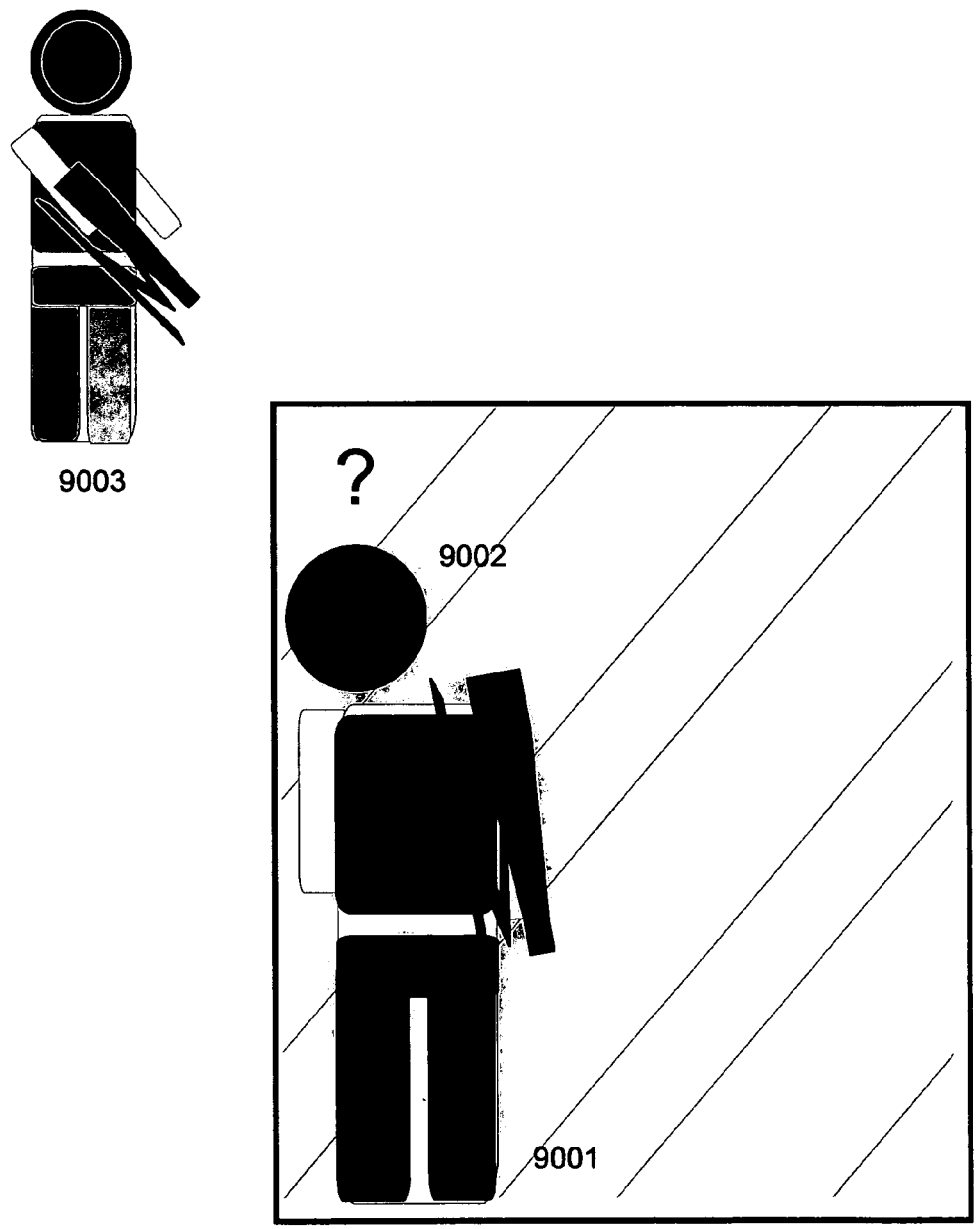
FIG. 9 illustrates the a military or S.W.A.T. situation wherein the solider or officer is faced with a blind corner to look around with a potential assailant on the other side.

FIG. 9 illustrates a military or S.W.A.T. situation wherein the solider 9001 or officer is faced with a blind corner to look around 9002 with a potential assailant on the other side 9003.

Figure 10:
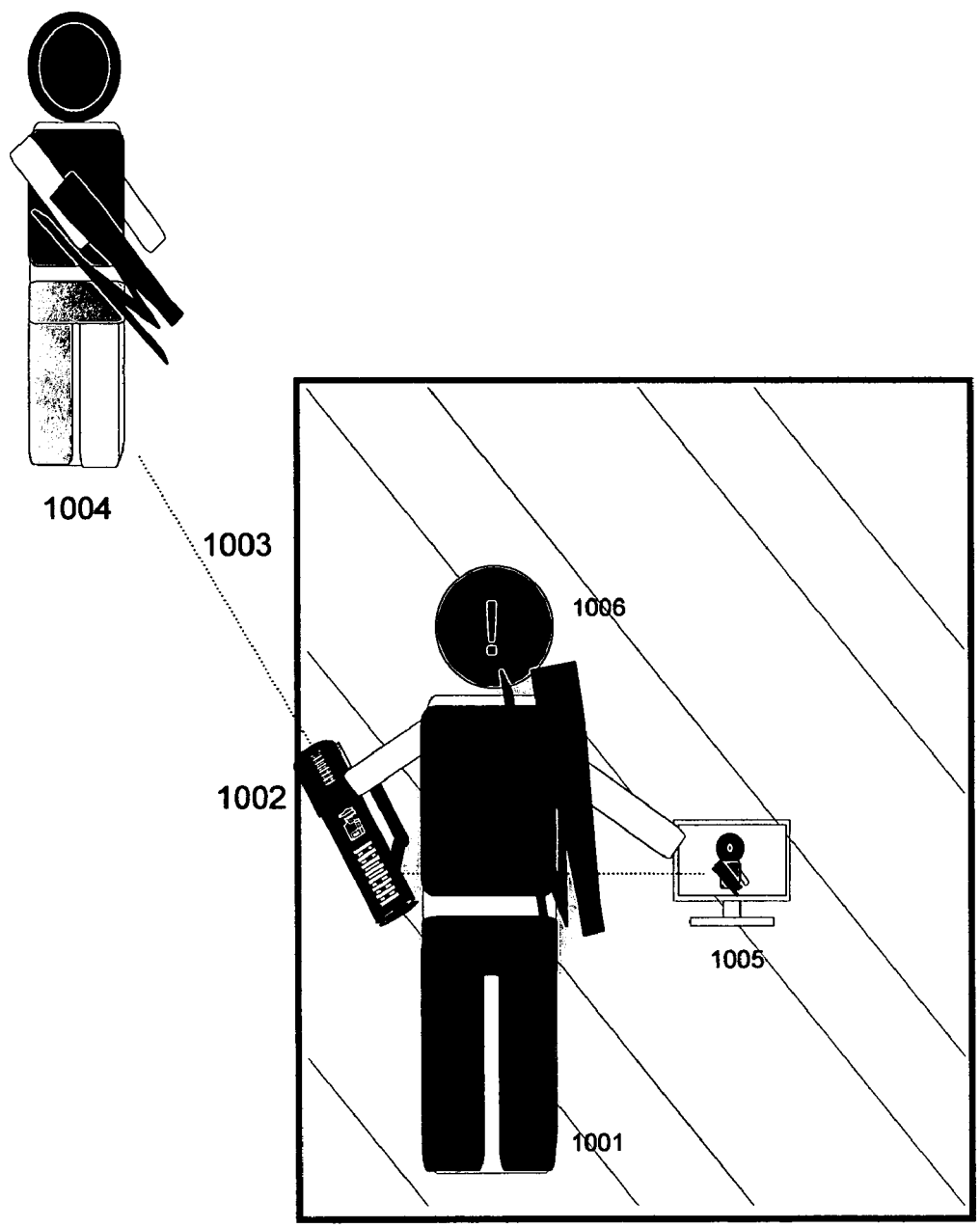
FIG. 10 illustrates the same situation being handled with the IGS camera and its remote viewer.

FIG. 10 illustrates the same situation being handled with the IGS camera and its remote viewer. Solider 1001 uses the IGS 1002 to view around a corner 1003 to see 1006 the assailant 1004 on remote handheld monitor 1005.

Figure 11:
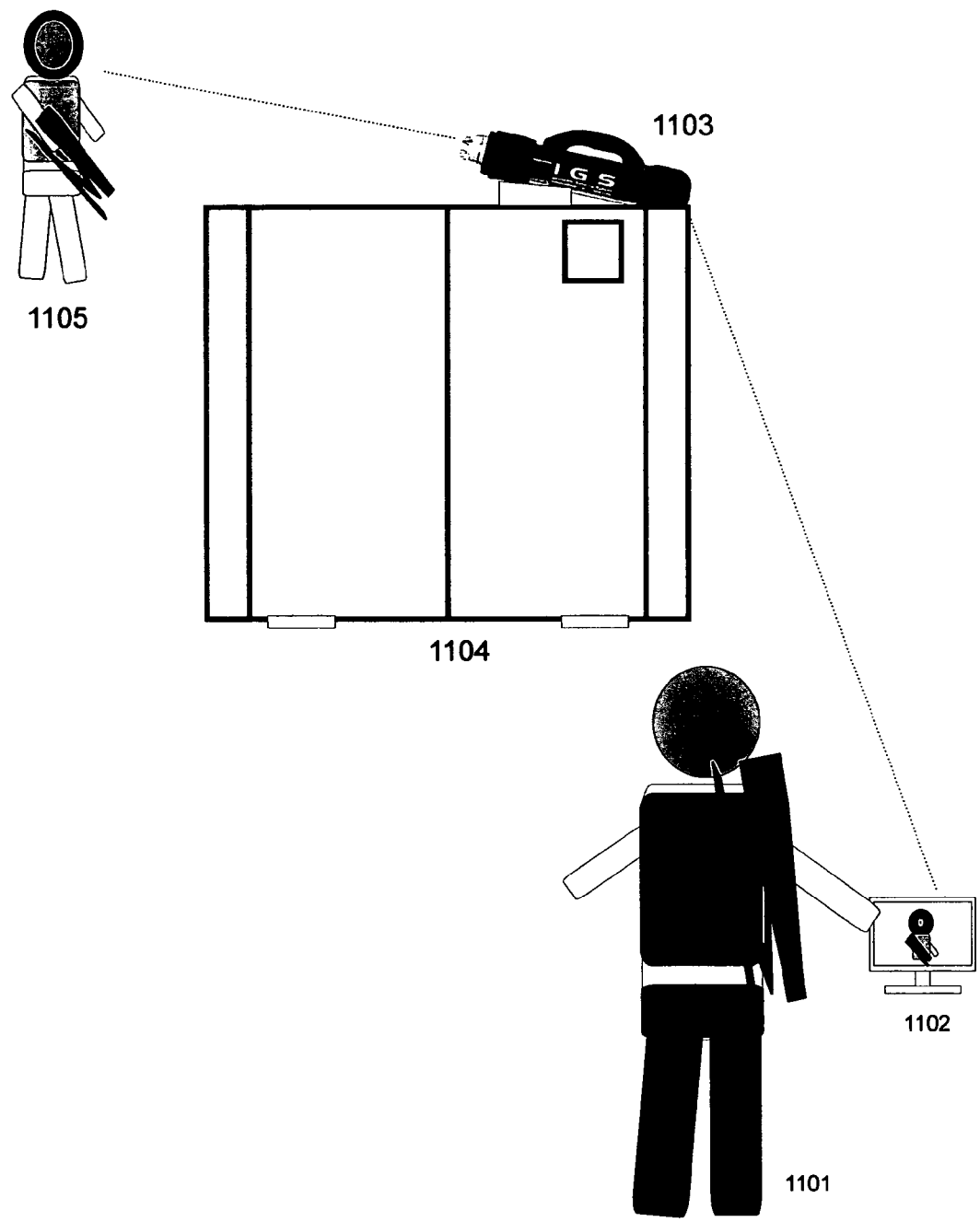
FIG. 11 illustrates the IGS camera in use in a military scenario detecting the advance of an assailant from a fixed, high position a safe standoff distance away.

FIG. 11 illustrates standoff distance scenario being handled with the IGS camera and its remote viewer in a different configuration. In this illustration solider 1101 uses the IGS 1103 from a fixed position on top of a crate 1104 to view around a corner from a safe standoff distance away. The illustration shows how the IGS 1103 is used to see the assailant 1105 on remote handheld monitor 1102 without placing solider 1101 in harms way.

Figure 12:
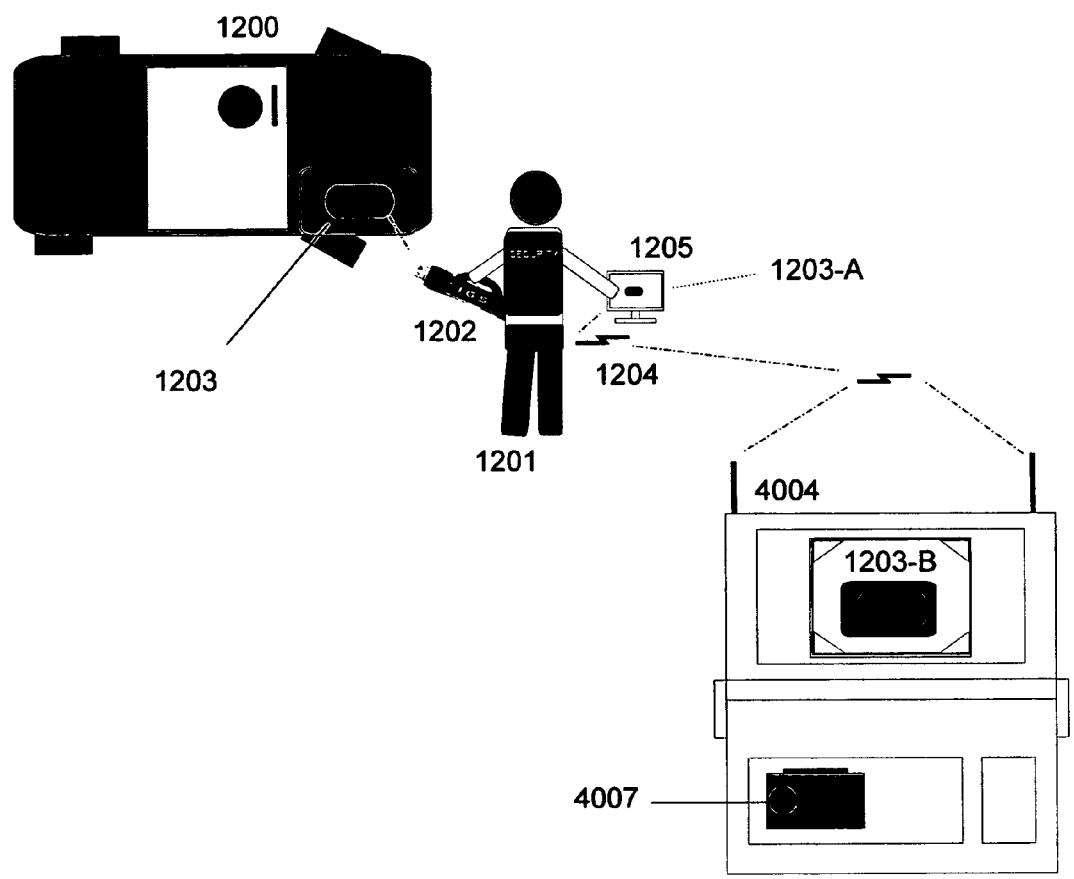
FIG. 12 illustrates the IGS in use as a wireless vehicle inspection and documentation system.

FIG. 12 illustrates the IGS in use as a wireless vehicle inspection and documentation system. As shown the security officer 1201 inspects the wheel well of a vehicle 1200 entering a security checkpoint. The IGS camera 1202 looking in the wheel well sees an unusual object 1203 and transmits it's image wirelessly 1204 which show up on the IGS handheld monitor 1205 as image 1203-A and on the IGS portable recorder case 4007 screen as 1203-B.

Figure 13:
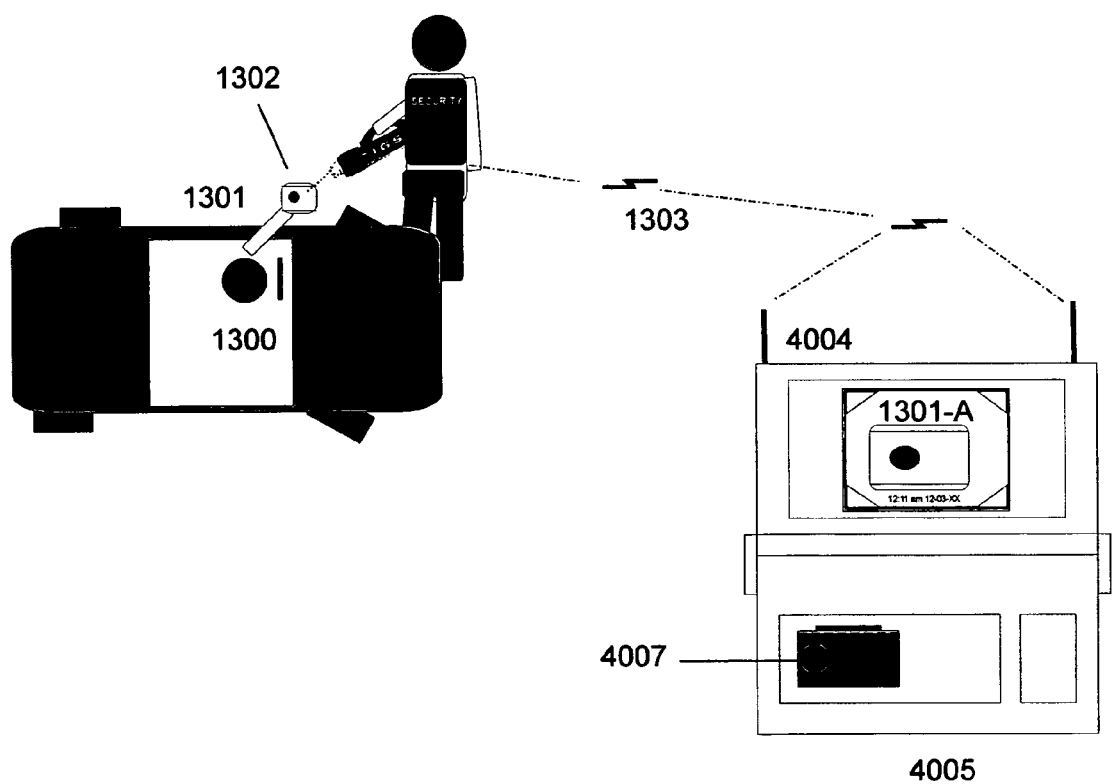
FIG. 13 illustrates the IGS in use as a wireless identification registration and documentation system.

FIG. 13 illustrates a security officer scanning 1302 a drivers license 1301 of driver 1300 upon entry to a facility. The license image is transmitted 1304 to the IGS portable case which records the date and time of the entry 1301-A via digital video recorder 4007.

Figure 14:
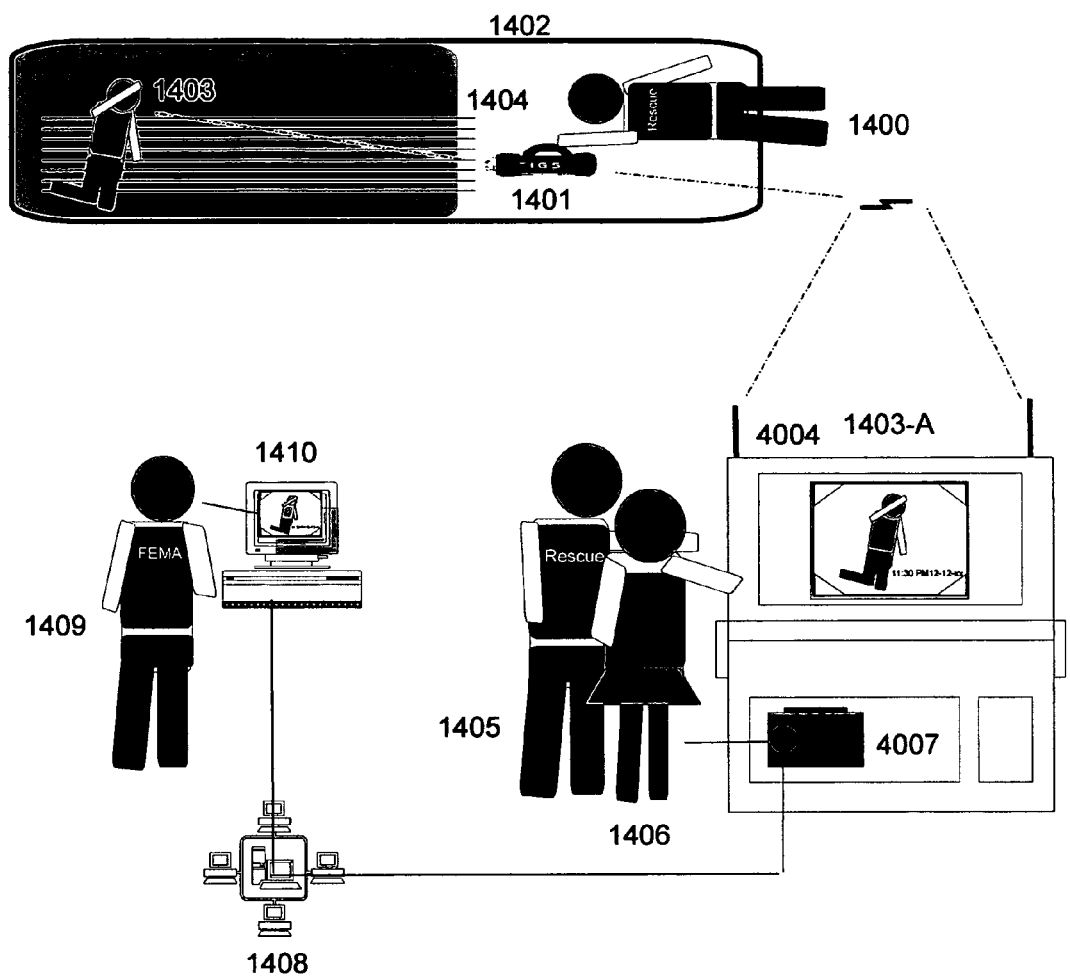
FIG. 14 illustrates the IGS system in use in a rescue operation in a tunnel using the infrared for night vision.

FIG. 14 shows the IGS 1401 and IGS portable case in use in a rescue operation. Rescue worker 1400 is shown 1404 crawling in a tunnel 1402 and spotting with the IGS a stuck person 1403 that is seen by rescue worker 1405 and bystander 1406 on screen 1403-A while the entire event is being recorded by the digital video recorder 4007 with date and time stamps. The IGS system via a computer or digital recorder 4007 is also capable of displaying the rescue operations live on the internet 1408, making the IGS an invaluable tool for first responder 1410 briefs in real-time to government agency employees 1409.

Figure 15:
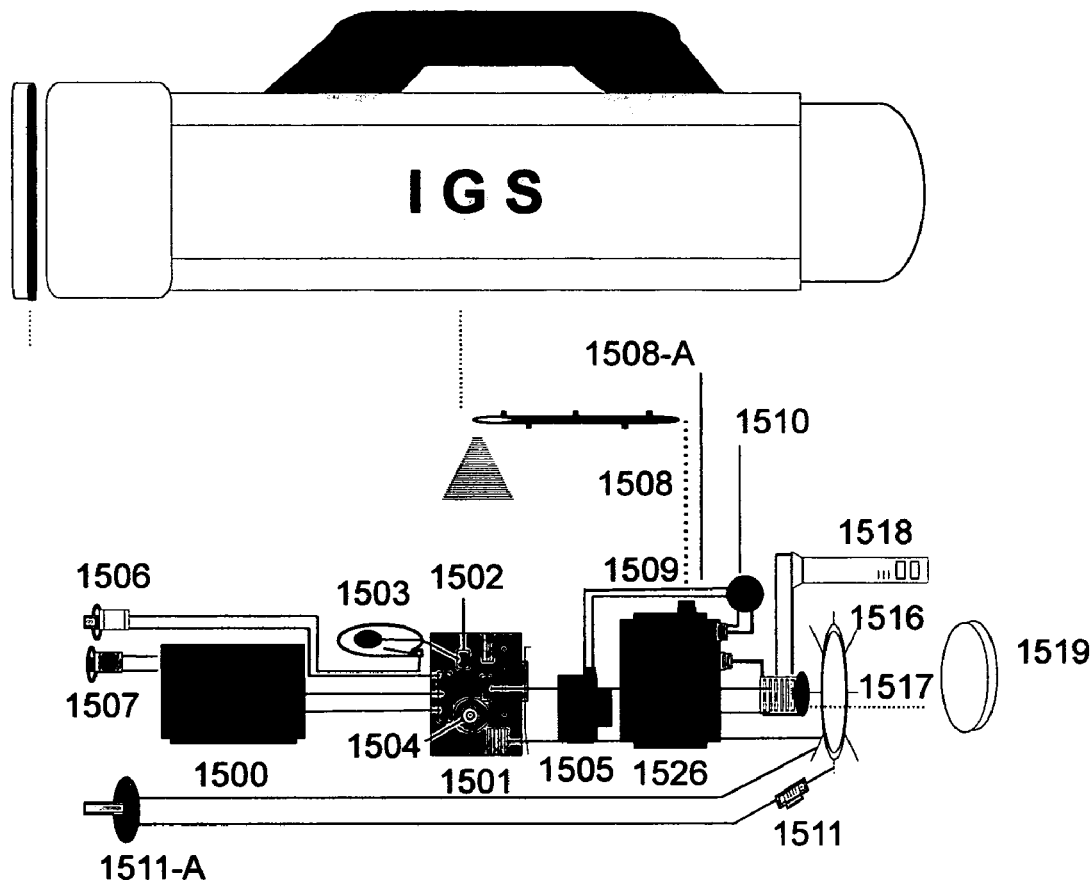
FIG. 15 shows the full components of the IGS unit and their wiring and interaction sequence.

FIG. 15. shows the entire component structure and system of the IGS unit with wiring and interactivity of components. Starting with battery pack 1500 (a lithium ion long duration battery) the circuit supplies power to 1501 relay and timer that is activated by a mercury switch 1503 that is in series with a travel switch 1506 designed to cut power to the entire system during shipping or travel. The dial 1504 adjusts the length of time the timer stays on when the mercury switch 1503 which is activated by motion during use. The system is designed so that when the time limit has expired, (approximately 2 minutes without use), the power is switched off by relay 1501 so as not to unnecessarily drain the power from the battery, 1500 without the unit being in use. Charging socket 1507 accepts the external power (not shown) for recharging. Component 1505 is a radiological/gamma detector and alert module (commercially available) designed to detect radiological elements and gamma rays, which, upon detection, triggers an audible alarm through the audio input line 1509 of the IGS transmitter 1526. Also in line with the audio input line 1509 is IGS units' microphone 1510, which collects remote audio information for transmission via audio transmitter 1526 as well. The transmission of audio/video signals via transmitter 1526 is enhanced by a high gain antenna 1508 that is attached to an antenna terminal 1508-A on the side of the transmitter unit 1526. The aiming laser 1518 is shown sharing power with infrared (Sony chip 1030 BBW or equivalent) camera 1517 and the infrared LED illuminator ring 1517 is on/off controlled by photo sensor 1511 and further brightened or dimmed by potentiometer (1 K ) 1511-A. Protective lens, (½ inch thick Lexan) 1519 protects the camera 1517 from damage from rough use or harsh environments.

Figure 16:
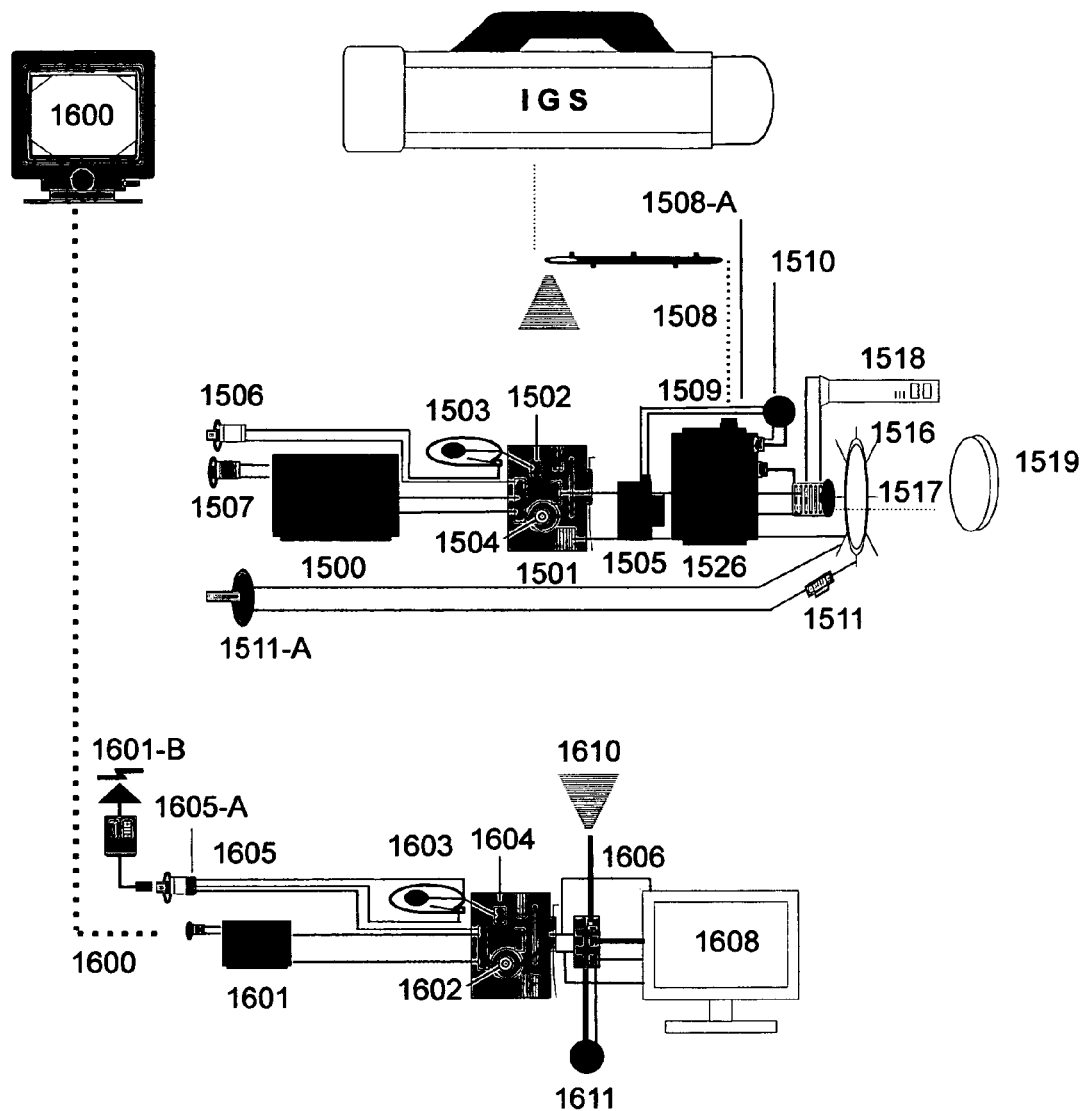
FIG. 16 shows the full components of the IGS handheld monitor and their wiring and interaction sequence.

FIG. 16 shows the exploded view of the components of the IGS handheld video monitor and audio amplifier unit assembly. The unit 1600 is powered by battery 1601 (lithium ion 16.8 volt) and is recharged via socket 1601-A when connected to charger 1601-B Power is supplied to timer relay 1604 which is switched on by mercury switch 1603 during normal use. The "on time", during use, is adjusted by dial 1602. This feature enables a user to pick up the unit to automatically turn it on. When the unit is set down the unit will shut off after a predetermined amount of time (1-15 minutes) so as not to waste the battery power if someone forgets to turn the unit off. Switch 1605 also has a second position 1605-A to override the mercury switch and timer circuit and keep the unit on for extended surveillance use. The travel switch 1605 interrupts the mercury switch circuit so the unit will not be accidentally turned on by movements in shipping or travel. The power turned on, powers up the audio/video receiver normally (900 mgz-5.8 ghz frequency range) which is wired to a mini audio amplifier/monitor (commercially available) 1608 which displays video images on 1608 and plays audio transmissions on speaker 1611.

Figure 17:
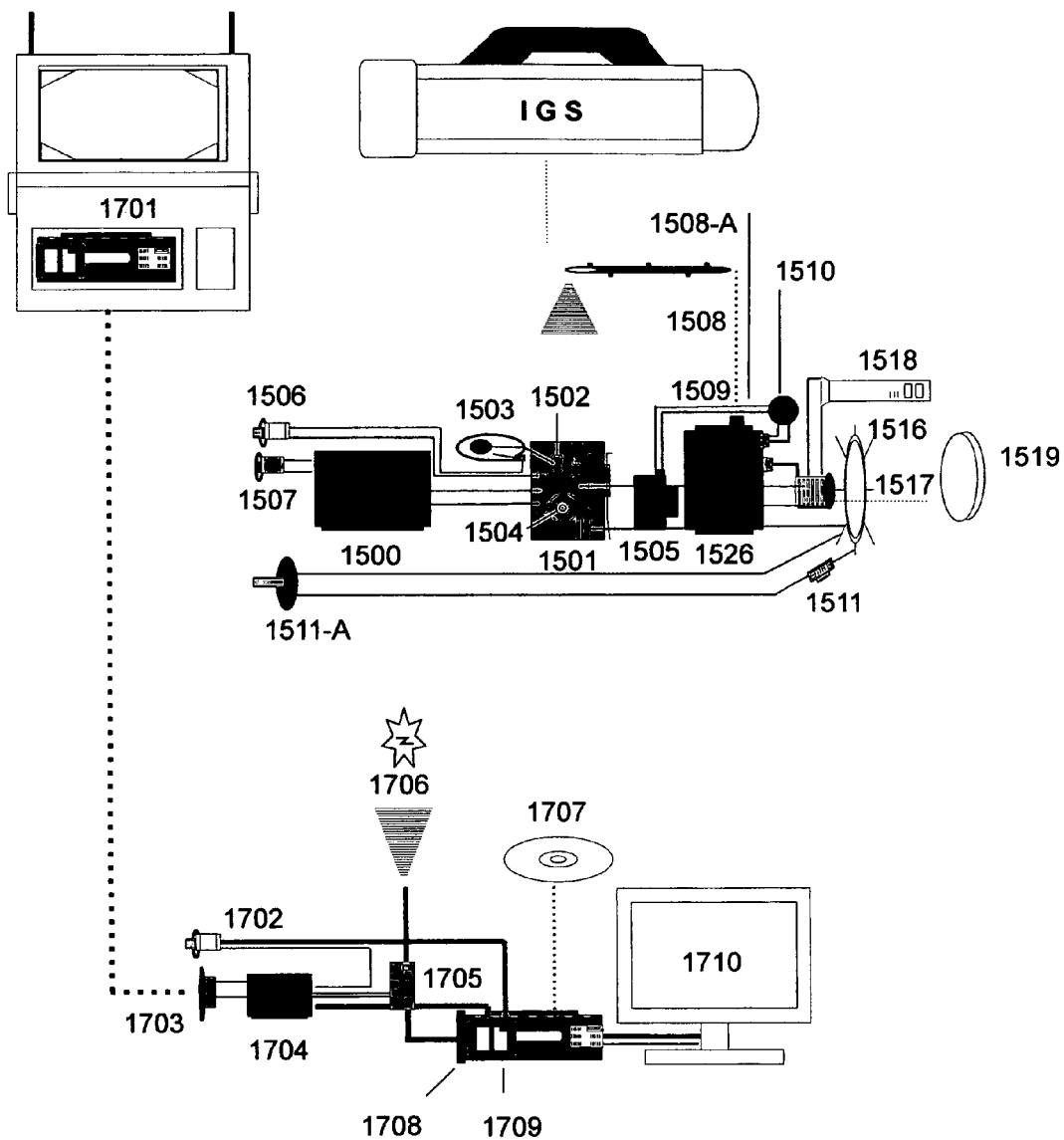
FIG. 17 shows the IGS portable receiver case that is equipped to process optical alerts detected by the IGS in detection use.

FIG. 17 shows the portable IGS case 1701 and it is components and their interconnectivity with the use of a computer 1709 as a means of processing wireless audio visual information 1706 being received by receiver 1705. The computer 1709 is equipped with a video card (GV 600 or equivalent) for receiving the audio/video signal from receiver 1705. Via the video card 1708 and the software (GV-600 driver or equivalent) the audio video signals are processed for results highlighted in FIGS. 7, 8 9, 10,11,12, 13 and 14).

FIGS. 15, 16, 17 and 18 show the entire system, component structure and component variations, including a suggested housing, that would enable a person skilled in the art, to make and use the invention without extensive experimentation.

While the present invention has been described with reference to the preferred embodiments, those skilled in the art will recognize that numerous variations and modifications may be made without departing from the scope of the present invention. Accordingly, it should be clearly understood that the embodiments of the invention described above are not intended as limitations on the scope of the invention, which is defined only by the following claims.

We claim:

1. A remote information and intelligence gathering machine, transmitter and system comprising:

a machine in a housing that serves as a medium for the gathering and simultaneous real-time wireless transmission of a plurality of intelligence data to a base station comprising;

a transmitter for transmitting a plurality of electronic data from a remote machine and housing to a base station for information and intelligence gathering and review;

a digital camera as a component of said machine and housing to capture digital video images for transmission to a remote base station for intelligence inspection;

a laser diode and housing as a component of said machine and housing used in combination with said digital camera to optically contact and illuminate an intruder that enters a restricted area, and the transmission of said optical event to a base station for remote information and intelligence inspection;

a microphone as component of said machine and housing to capture audio data for transmission to a remote base station for information and intelligence inspection;

a radiological detector as a component of said machine and housing to detect radiological elements and set off an alarm for transmission to a remote base station for remote information and intelligence inspection;

wherein said housing of the machine is designed and balanced by a handle and system of counterweights designed and located at a distance from the center of gravity so as to carry said machine and digital camera in a manner so as to effect a smooth and steady picture transmission to a remote base station for information and intelligence inspection and review, and comprising;

a cylinder with proportional balancing collars calculated to provide a center of balance weight distribution for providing a steady picture for transmission to a remote base station for information and intelligence inspection and review.

2. In accordance with claim 1, a base station and receiver system for the receipt of remotely transmitted information and intelligence comprising:

a machine in a housing that serves as a medium for the receipt and simultaneous real-time processing and display of a plurality of intelligence data from a remote transmitter comprising;

a wireless video receiver installed in said base station for the receipt and simultaneous real-time processing and display of video image information and intelligence received for immediate or recorded review by law enforcement or military personnel;

a computer and video card for the optical processing of a laser assisted optical video event created by the laser and camera configuration transmitted to said base station by the machine for the detection of an intruder located in a remote location;

an wireless audio receiver, amplifier and speaker system as component of said base station to receive play and record audio data and radiological alarm information for inspection and review by law enforcement and military personnel.

* * * * *